A. B. Ely,

Heel Stiffening.

No. 87,916. Patented Mar. 16, 1869.

Witnesses.
Cornel<sup>s</sup> Jacobs
John P. Jacobs

Inventor.
A. B. Ely

UNITED STATES PATENT OFFICE.

ALFRED B. ELY, OF NEWTON, MASSACHUSETTS.

IMPROVED HEEL-STIFFENING.

Specification forming part of Letters Patent No. 87,916, dated March 16, 1869.

*To all whom it may concern:*

Be it known that I, ALFRED B. ELY, of Newton, in the State of Massachusetts, have invented a new and useful Improvement in Heel-Stiffenings for Boots and Shoes, of which the following, with the drawings, is a full description.

Counters have been made of leather, and these formed over the last and shaped by hand in the process of shoe-making. Heel-stiffeners of rubber and its compounds have been made, molded, and formed for use; but stiffeners of leather or leather-board have not been made and furnished already shaped and prepared for use as an article of manufacture. This my invention proposes to do.

Figure 1:
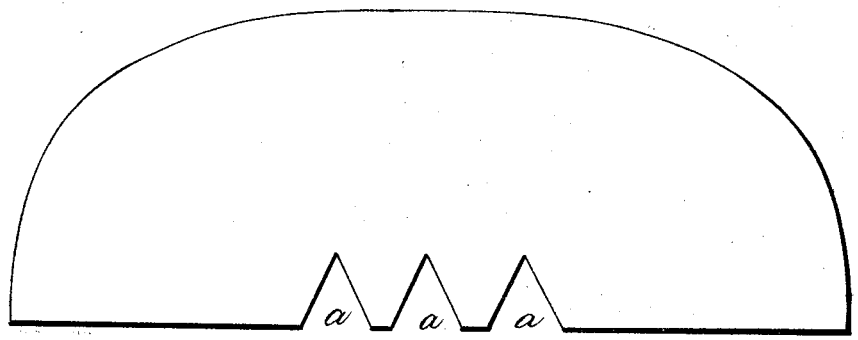
Figure 2:
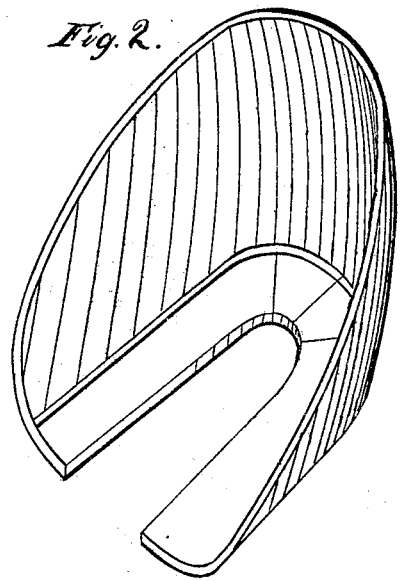

I arrive at my result in the following way: The counter, which may be leather, of one or more thicknesses, and made of leather-board or scraps, or otherwise, is first cut out in the shape represented by Figure 1, and the notches *a a* are cut in the lower edge. It is then placed upon or in a female mold or die, and a male mold or die is brought down upon it, and it is pressed into the shape represented by Fig. 2.

The best way is to moisten the leather, and to have the molds or dies warmed or heated, so that while the pressure gives the stiffener the proper shape the heat shall dry up the moisture, and give it suitable hardness and elasticity.

The slits cut beforehand will enable the leather to assume a smooth surface along the under side, and will also facilitate the use of the article.

What I claim is—

As an article of manufacture, a leather heel-stiffener, when prepared, shaped in molds, and fitted for use as herein described.

In testimony whereof I have hereunto subscribed my name.

ALFRED B. ELY.

Witnesses:
 CORNELS. JACOBS,
 JOHN P. JACOBS.